C. J. LAWLESS.
SILO AND LIKE RECEPTACLE.
APPLICATION FILED NOV. 25, 1912.
1,072,387.
Patented Sept. 2, 1913.
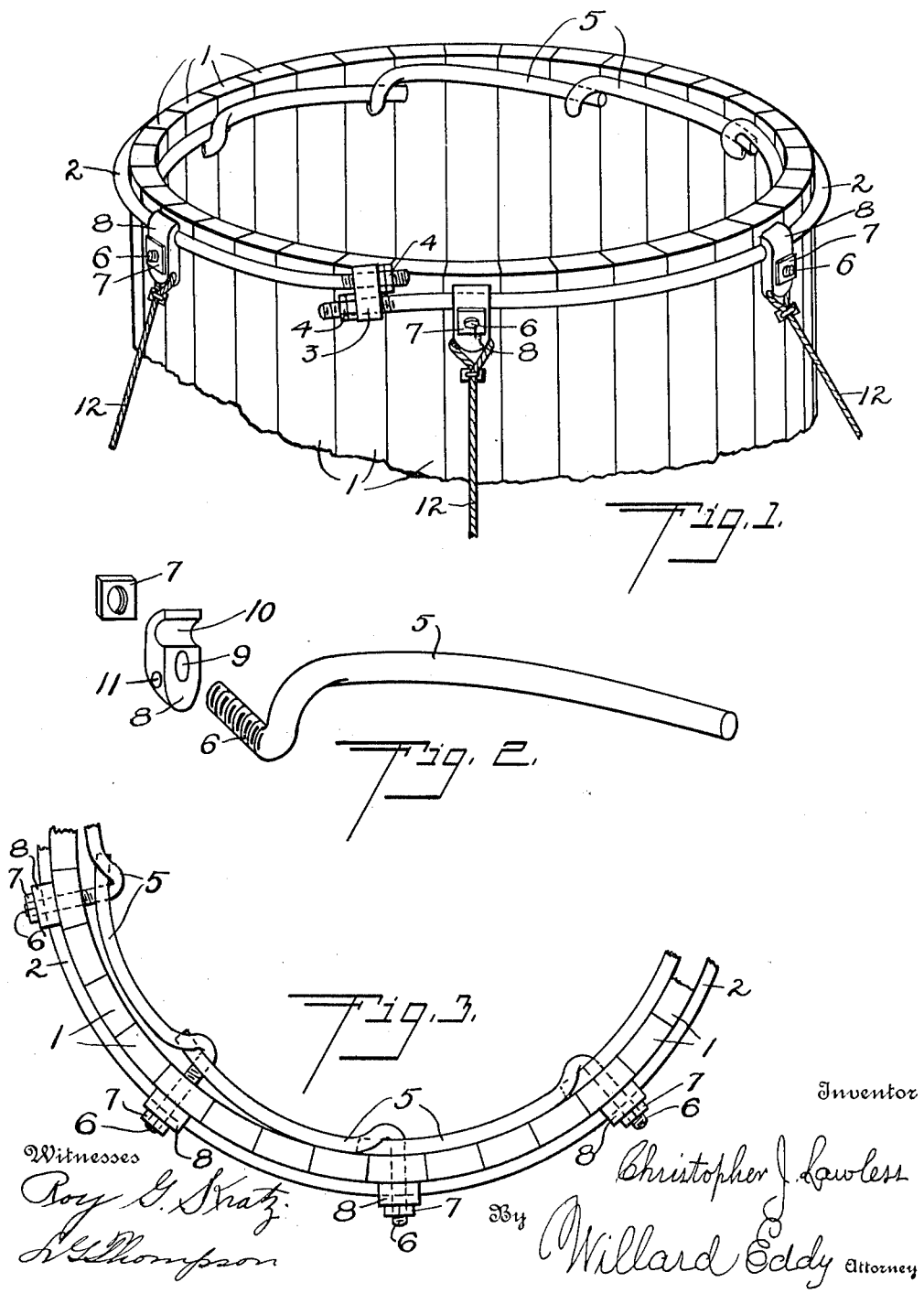

UNITED STATES PATENT OFFICE.

CHRISTOPHER J. LAWLESS, OF LINCOLN, NEBRASKA.

SILO AND LIKE RECEPTACLE.

1,072,387. Specification of Letters Patent. Patented Sept. 2, 1913.

Application filed November 25, 1912. Serial No. 733,239.

*To all whom it may concern:*

Be it known that I, CHRISTOPHER J. LAWLESS, of the city of Lincoln, county of Lancaster, and State of Nebraska, have invented certain new and useful Improvements in Silos and Like Receptacles, and have described the same in the following specification, illustrated by the accompanying drawings.

My invention relates primarily to that class of cylindrical silos in the construction of which a plurality of staves are set edge to edge to form the peripheral wall.

It also relates to other receptacles of like construction, such as barrels, kegs, circular water-tanks and the like. It need not be particularly described, except as embodied in silos.

It is the object of the invention to strengthen a silo of the specified class as against possible buckling of the staves and possible collapse of the silo walls; to provide superior means for attaching to the silo walls the usual anchoring cables; to facilitate the erection of the silo, and prevent it from being blown down by the wind before completion, by providing means for holding the staves in position in an increasing group while they are being assembled; and in general to produce a superior receptacle of the specified class. To this end I incorporate in my improved silo an external wire hoop encircling the top of the receptacle, an internal wire hoop comprising a series of mutually engaging and separable hoop sections, and means for clamping the staves between the external and the internal hoops.

The best manner in which I have contemplated applying the principles of the invention, is shown in the drawings; yet the invention itself is not restricted to any specific arrangement or construction of parts, excepting as limitations of that kind are either expressed or necessarily implied in the subjoined claims.

Figure 1 of the drawings is a perspective view of the upper portion of a silo which is constructed in accordance with these principles. This silo is shown open at the top and uncovered. Fig. 2 is a group of details in perspective. Fig. 3 is a plan of a portion of the same silo incompletely assembled.

This illustrative silo comprises a plurality of staves 1 and the encircling hoop 2, which is adjustable in circumference by means of the connecting lug 3 and the nuts 4, all common in silos of this class. The internal hoop consists of a plurality of hoop sections 5, formed of stiff elastic wire. Each of these sections comprises a main portion which is denoted by the same numeral 5, and a screw-threaded shank 6. Viewed from above, the main portion 5, when free from tension, has from end to end, an approximately circular curvature somewhat sharper than that of the silo wall. The curvatures here referred to are plainly exhibited in juxtaposition at the left in Fig. 3. Each of these sections is somewhat longer than the collective width of several of the staves 1. At one end it is pivotally supported by its straight and screw-threaded shank 6, which is inserted in a radial and horizontal position, and has its bearing, in a hole through one of the staves. At the same time, the free end of each hoop section, being by a pivotal movement of the latter laid across the shank 6 of the contiguous section, is permanently supported thereon in the position shown in the drawings, and is retained in that position by the upwardly bent portion of the last mentioned section, adjacent to its pivotal shank.

The means for clamping the inner and the outer hoops to the silo staves, comprise a nut 7 and a perforated clamping-block 8, which are located on each shank 6, outside the silo wall. This block has a central perforation 9 for the accommodation of the shank 6, a groove 10 across its inner face at the top for engagement with the external hoop 2, and a hole 11 near the bottom for attachment to the anchor cable 12.

In assembling the parts of this silo, a plurality of the staves, forming a group spanned by a single internal hoop section 5, are clamped together independently by manipulation of that hoop section and of the clamping mechanisms adjacent to the ends of that section respectively. Then another group, contiguous to the first, is similarly assembled and similarly clamped together and to the first group; and then successive groups one after another in the same way till the cylindrical wall of the receptacle is complete. Consequently the silo, even before completion, is able to stand up against high winds. Again, the clamping of the staves between the inner and the outer hoops bends the inner hoop sections toward straightness and into conformity with the larger curvature of the silo wall. By this bending, each hoop section, being elastic, is placed under tension and caused to exert continual outward pressure against the inside of the staves it subtends. By this arrangement, the staves are perpetually held by a spring clamp comprising an inner hoop having interlocking sections, and an outer hoop of adjustable circumference. In short, my improved receptacle, being constructed and operating as described and shown, accomplishes the object of the invention in all its branches above specified.

I claim as my invention—

1. A receptacle of the specified class, comprising a plurality of cylindrically disposed staves, an external hoop encircling the staves, an internal hoop having separable interlocking sections separately pivoted to the wall of the receptacle, and means for clamping the staves between the external and the internal hoops.

2. A receptacle of the specified class, comprising a plurality of cylindrically grouped staves, an external hoop, adjustable in circumference, encircling the staves, an internal hoop having a plurality of separable overlapping sections slidable upon each other, and means for clamping the staves between the hoops.

3. A receptacle of the specified class, comprising a plurality of staves arranged cylindrically, an external hoop of adjustable size encircling the staves, an internal hoop having spring sections of sharper curvature than the stave cylinder, and means for clamping the staves between the external hoop and the internal hoop sections.

4. A receptacle of the specified class, comprising a plurality of staves arranged cylindrically, an external hoop of adjustable size, encircling the staves, an internal hoop having overlapping sections of sharper curvature than the internal curvature of the stave cylinder, and means for clamping the staves between the external hoop and the several overlapping sections of the internal hoop.

5. A silo of the specified class, comprising a plurality of staves arranged cylindrically, an external wire hoop of adjustable circumference, encircling the staves, an internal wire hoop composed of interlocking curved sections having pivot shanks journaled in the cylinder wall, clamping blocks working on the pivot shanks, and engaging the external hoop, and means for adjusting the clamping-blocks on the pivot shanks.

In testimony whereof I hereunto subscribe my name in the presence of two witnesses.

CHRISTOPHER J. LAWLESS.

In the presence of—
  WILLARD EDDY,
  EVA CAYLEY.

---

Copies of this patent may be obtained for five cents each, by addressing the "Commissioner of Patents, Washington, D. C."